March 31, 1942.     K. SAUR     2,278,396
SERVO-MOTOR CONTROL
Filed Sept. 6, 1941
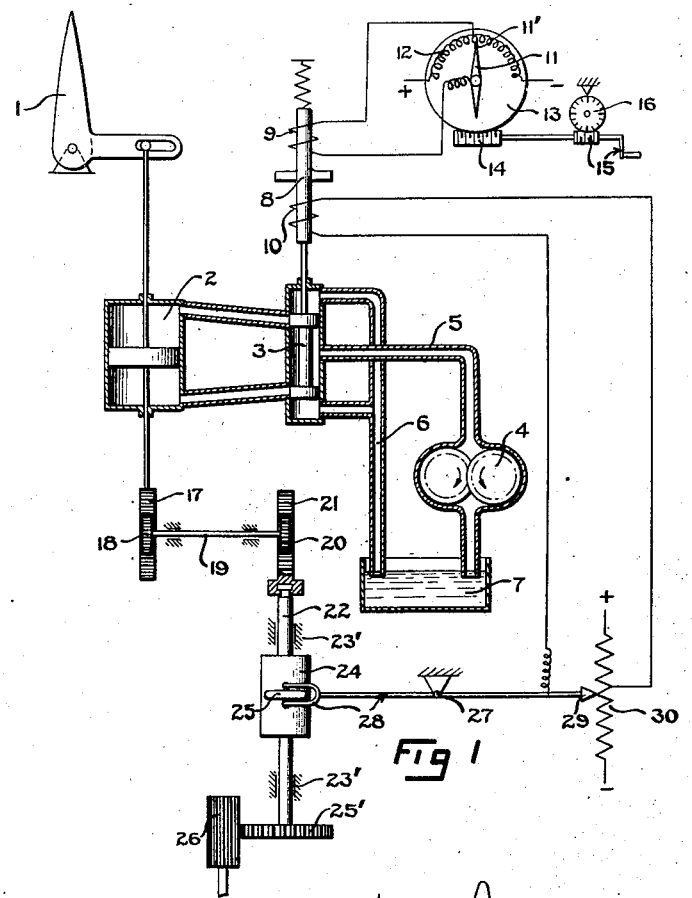
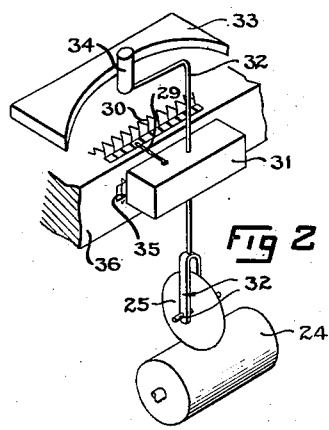
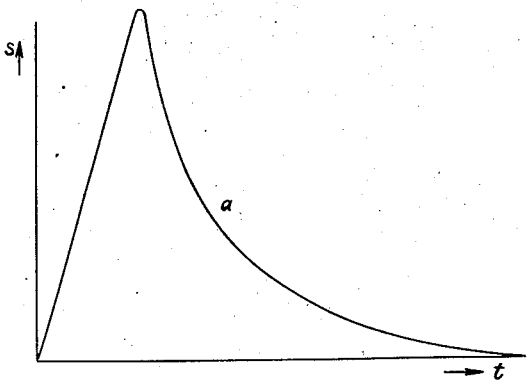
INVENTOR
Karl Saur
BY
Cerstvik and Kalman
ATTORNEYS Patented Mar. 31, 1942

2,278,396

UNITED STATES PATENT OFFICE 2,278,396

SERVOMOTOR CONTROL

Karl Saur, Berlin-Reinickendorf, Germany

Application September 6, 1941, Serial No. 409,890
In Germany October 3, 1939

8 Claims. (Cl. 121—41)

This invention relates to means for controlling by a regulated yielding or elastic follow-up system the operation of servo-motors or similar relay apparatus, for example, such relays as operate rudders, valves, and the like.

In order to satisfactorily meet a certain required operating standard, as for example the maintaining of a constant speed in an engine or aircraft, or the proper steering of vehicles such as aircraft, with as little surging or oscillating through maxima and minima as possible, it is necessary not only to displace the control member of the relay to provide the primary impulse, but also to provide means whereby the motion resulting from such impulse will follow up and dampen or oppose the primary impulse. It is desirable that this follow-up should be accomplished in an elastic rather than a rigid manner, so that the agent to be controlled, such as for example a rudder or valve, may be set to the requisite angle or position with the assurance that its governing will be accomplished without violent movement.

It has heretofore been proposed to provide means for producing a yielding return effect, commonly known as an isodrome effect, by well-known electrical devices and also by the use of fluids, either alone or in combination with other agents, such as dashpots and springs. These hitherto proposed devices, however, not only are unreliable in operation, but they also possess the additional disadvantage that the speed at which the elastic member effects the shortening or lengthening of the return connection is not constant, and therefore the control is irregular.

Accordingly, it is an object of the present invention to provide a novel device for carrying out this isodrome effect in a controlled manner that will obviate the difficulties heretofore encountered in devices of this character.

It is another object to provide a novel follow-up system for yieldingly returning, for example, a relay motor control member to the position from which said member was displaced to actuate said relay motor.

A further object is to provide a novel system of the above type which is connected between the relay motor and the control mechanism for said motor, said system being actuated by the latter.

Still another object is to provide a novel apparatus for controlling an automatic steering system for vehicles, such as aircraft.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing, wherein like reference characters refer to like parts throughout the several views, Fig. 1 is a diagrammatic view of a complete automatic rudder system incorporating the present invention;

Fig. 2 is a similar view of another means for mounting the friction elements of the invention; and Fig. 3 represents a curve of effort, displacement plotted against time, for the purpose of graphically illustrating the correcting characteristics of this invention.

The present invention is illustrated, by way of example, as connected to the automatic steering system of an aircraft, and comprises a frictional wheel drive, having one continuously revolving friction member, as, for example, a drum, which is so mounted as to provide freedom of translation along its axis, and a second friction member, such as, for example, a wheel or disc resting on the aforesaid drum. The friction wheel is carried by a supporting member, as, for example, a lever, which pivots about a fixed point and thus permits the wheel, besides rotating with the drum, to temporarily follow it in motion of translation. The pivoting supporting member then effects, by virtue of the motion imparted by the wheel, either directly or indirectly, a differential correction upon the primary impulse, thus tempering and smoothing out the latter and preventing sudden surges of power to the member being controlled. It will be made clear from the accompanying drawing and the following description that this novel device is admirably adapted for use in connection with any servo-motor or relay system, and particularly in connection with such systems designed for the steering of aircraft.

Considering Fig. 1, the rudder 1 of an aircraft or other ship is actuated by a hydraulic or other motor 2, which is in turn controlled by a valve 3. A pump 4 draws liquid from a tank 7 and delivers it under pressure through a conduit 5 to whichever end of motor 2 is opened by valve 3, the liquid from the other end of said motor returning through an exhaust passage 6 to tank 7. Valve 3 is actuated by a spring-restrained armature 8 of a differential relay 9, 8, 10, having two coils 9 and 10. Relay 8, 9, 10 and consequently valve 3 will be affected by a current in coil 9, and also by a current in coil 10. The latter current preferably produces an opposite effect to the former current and tends to hold back or temper the motion of armature 8, thus giving a differential effect, as will be hereinafter more fully explained.

A pole-seeking compass, comprising a needle 11 and a housing 13, preferably has a contact element 11' mounted on the end of said needle so as to slidably engage a potentiometer resistance 12 carried by said housing. Compass housing 13 is set to a desired course by a crank 15, the latter having a worm 14 mounted thereon for engagement with a gear which is preferably formed or mounted on the periphery of said housing. A compass card 16 is similarly actuated by crank 15 to indicate the setting of compass 11, 13. Resistance 12 is connected to a direct current source, and coil 9 has one end thereof connected to the potentiometer resistance 12 and the other end to contact element 11'. Accordingly, coil 9 is energized in a degree and direction which are functions of the degree and direction of the displacement of compass needle 11 relative to resistance 12. If the course of the craft carrying compass 11, 13 changes from the compass setting, needle 11 moves relative to resistance 12, creates a flow of current through coil 9, and actuates armature 8, causing the latter to move valve 3 and produce a flow of pressure fluid into one end of servo-motor 2 to thereby actuate the latter. The servo-motor is thus operated in response to changes in course and controls rudder 1 in a manner to bring the craft back to the course set on card 16 and by housing 13.

In order to modify the movement of valve 3 to and from neutral position, novel means are provided and comprise a rack 17 connected to the piston of motor 2 and movable thereby. Rack 17 rotates pinion 18, which is carried by a shaft 19, having a second pinion 20 mounted thereon, and the latter pinion, in turn, engages and is adapted to move a rack 21. A shaft 22 is secured to said last-named rack by means which transmit substantially no torque to said shaft and are adapted to axially displace the latter. Shaft 22 is journaled in bearings 23', which permit axial as well as rotary movement thereof, and said shaft has friction drum 24 and a gear 25' fixed thereto. Gear 25' is drivably engaged by a pinion 26 which is connected to a suitable source of power (not shown), said pinion being adapted to drive shaft 22 and drum 24 at a low constant speed with substantially no load.

A friction wheel 25 mounted to rotate freely in the bifurcated end of a lever 28 rests by gravity or spring pressure on drum 24 and lever 28 pivots freely about point 27 so that translatory motion of drum 24 along its axis in response to rack motion will carry wheel 25 axially with no appreciable resistance. Lever 28 carries contact arm 29 of a restoring potentiometer resistance winding 30, the ends of which are connected to a suitable source of direct current. Differential or restoring coil 10 of the differential relay 9, 8, 10 is fed from potentiometer winding 30, being connected at one end to a central point in winding 30 and at the other end to contact arm 29.

When, in response to an impulse in coil 9, the rudder is actuated, the movement of motor 2 carries the slowly rotating drum 24 in one direction or the other along its axis of rotation, as a result of which the rotating wheel 25 is also carried along by the friction. The bifurcated end of lever 28, being carried by wheel 25 in one direction, causes contact arm 29 to move in the other direction along resistance 30 and sets up a differential or correcting current in coil 10, opposing the influence of coil 9 and hence damping or restricting motion of armature 8. The circumferential speed of drum 24 at the contact point of wheel 25 has one component in the plane of rotation of wheel 25, and a second component perpendicular to that plane, the magnitude of the latter component depending upon the axial displacement of wheel 25 from its central position. The component in the plane of rotation causes wheel 25 to rotate about its axis, while the component perpendicular to that plane causes the wheel to move sidewise along its axis, that is, to seek the center or zero position again. Upon a large displacement of wheel from the mid-position shown in the drawing, in response to a wide rudder throw, arm 28 at first seeks to return to its mid-position rapidly but this return becomes slower as the mid-position is approached until finally the restoring speed drops to zero as the wheel reaches that position shown in the drawing. Thus, as the craft is returning to its course due to actuation of the rudder 1, the compass casing 13 moves with the craft to restore the relation between contact 11' and resistor 12 to the set position, and at the same time the elements 25-28 move back to their zero position, thereby controlling means 10 to balance the effect on coil 9 of the relative restoring movement between 11 and 12, and, thus, properly controlling the operation of valve 3 during such return movement of the compass to the set position. As the arm 28 need merely move the sliding contact 29, and is consequently operating under virtually no load conditions, wheel 25 of yielding isodrome couple 24, 25 will be returned practically completely and with constantly decreasing speed to the neutral position. Fig. 3 shows a graph of such a movement in which the offset or displacements from a mean or mid position is plotted as ordinates against the abscissae of time $t$. The curve itself is designated as $a$. The big displacement in short time, which represents the peak of the movement at the beginning, is corrected, rapidly at first, and then in gradually decreasing ratio until the neutral position is reached, when the correcting movement has decreased to zero.

Another embodiment of apparatus for operatively mounting friction members 24, 25 is shown in Fig. 2. In this arrangement, member 28, which acted as a lever in Fig. 1, is supplanted by a member 32 of a different shape. The wheel 25 rotates as before and is carried in the bifurcated end of member 32, the latter being mounted for free rotation in a carriage 31, which may be displaceable along its length, for example, by being slidably mounted in a dovetail-shaped groove 35 in a stationary support 36. The end of member 32 forms a crank which carries a cam follower 34 which moves against and is guided by a stationary cam 33. Potentiometer 29, 30 is connected to carriage 31 and support 36 to be actuated by movement of said carriage relative to said support. The mounting is so arranged that when cam follower 34 and contact arm 29 are in the central or zero position, the plane of wheel 25 is perpendicular to the axis of rotation of drum 24, that is, the axes of wheel and drum are substantially parallel. When drum 24 is displaced in either direction along its axis, wheel 25 and carriage 31 are at first carried along bodily with it, and cam follower 34 bearing against cam 33 will consequently turn the crank and twist wheel 25 to a new position oblique to the rotating drum. The friction between wheel and drum will then return the wheel to the neutral or center position as in the prior case. One advantage of mounting the wheel according to this plan lies in the fact that the shape of the cam guide is in the control of the designer, and may be constructed to give the most desirable righting movements for different displacements, that is to impart any desired pitch to curve a.

There is thus provided novel means in the form of an elastic follow-up system for interposing between a servo-motor and its operating mechanism, which means is simple and reliable and embodies a unique correcting mechanism, and is particularly well adapted for installation in control systems and automatic steering mechanisms of ships or vehicles such as aircraft.

What is claimed is:

1. In apparatus embodying a servo-motor and a control system therefor, the combination with said apparatus of an isodrome couple comprising a rotating friction member displaceable along its axis in response to movement of the power element of said servo-motor, and a second friction member operatively connected to and rotatable with said first member, said second friction member being moved transversely with the first, said transverse motion producing an increasing inclination of the axes of the friction members relative to each other, and means for operatively connecting said isodrome couple to said control system, said last-named means including apparatus adapted to apply a control force in accordance with the transverse displacement of said second friction member.

2. In apparatus for regulating the speed or displacement of moving members in machines, said apparatus embodying a servo-motor and control means therefor, the combination with said apparatus of a follow-up system comprising two rotating members having engaging surfaces, one of said members frictionally driving the other, said members having substantially parallel axes when in a mean or uncorrecting position, means for axially inclining the axes of said members relative to each other in accordance with the movement of said servo-motor, and means responsive to the inclination between the axes of said members for exerting a correcting influence on the forces producing said inclination.

3. In apparatus of the class described, a servo-motor, a relay operatively associated with said servo-motor for controlling the operation of the latter, follow-up means embodying an isodrome couple comprising two rotating members, one of said members frictionally driving the other, said members being adapted to rotate about substantially parallel axes when in a mean position, means for inclining said axes in accordance with the action of said servo-motor, and means for translating said inclination into a force for modifying the operation of said servo-motor, said last-named means being operatively connected to said relay.

4. In apparatus for regulating the steering of ships and the like, a servo-motor for controlling the rudder throw, a differential relay, a course-setting instrument for controlling the primary impulse of the relay, a rotating friction member, means for displacing the latter along its axis in response to movement of the servo-motor, means for rotating said member at substantially constant speed, a second friction member operatively connected to and frictionally driven by said first member, means for mounting said second member whereby the latter is axially displaced by axial movement of said first member and is pivoted about an axis at substantially right angles to its axis of rotation, said second member being adapted to return to the normal position thereof at a rate determined by the extent of said pivotal movement, and means for converting axial movement of said second friction member into a secondary impulse for said relay.

5. In apparatus for producing a secondary dampening control movement in response to a primary control movement, a friction drum, means for rotating said drum at substantially constant speed, a rotary member frictionally engaging said drum and driven thereby, said member and drum normally having substantially parallel axes of rotation, means adapted to move said drum axially in response to the primary control movement, said axial drum movement producing an inclination between the axes of said member and said drum due to a displacement of said member, and means responsive to the axial displacement of said member for producing a dampening control force.

6. In apparatus comprising a power device for imparting a desired movement to a control member and means for controlling the operation of said device, the combination therewith of a drum member driven at uniform speed, means connecting said drum member to said power device whereby said member is moved aixally in accordance with the displacement of said power device, a rotary member frictionally driven by said drum member, means for mounting said rotary member so that the axis of rotation thereof is displaced and pivoted by the axial displacement of said drum member, and means actuated by the axial and pivotal displacement of said rotary member, said last-named means being adapted to modify the operation of said control means in accordance with said axial displacement for a period and in a manner determined by said pivotal displacement.

7. In an apparatus employing a power device and control means therefor, the combination therewith of a follow-up system comprising two frictionally connected rotating members, means adapted to change the relative inclination between the axes of said members in response to displacements of said power device, and means for translating the axial movement of one of said members into a control force, said last-named means being operatively connected to said control means to modify the operation of the latter.

8. In apparatus of the class described, a differential control relay, means for applying a primary impulse to said relay, and means for applying a secondary impulse to said relay to modify the operation of the same, said last-named means comprising a pair of frictionally connected rotating members, means responsive to the primary impulse for axially displacing one of said members and thereby axially displacing and pivoting the other of said members, means responsive to the axial displacement of said second member for producing a secondary impulse varying in accordance with said displacement, said secondary impulse being applied for a period determined by the pivotal displacement the axis of said second member, and means for determining the degree of pivotal displacement produced by a given axial displacement of said second member.

KARL SAUR.